(12) United States Patent
Cornell

(10) Patent No.: US 10,049,425 B2
(45) Date of Patent: Aug. 14, 2018

(54) MERGING FILTERS FOR A GRAPHIC PROCESSING UNIT

(71) Applicant: Google Inc., Mountain View, CA (US)

(72) Inventor: Brian Cornell, Kenmore, WA (US)

(73) Assignee: Google LLC, Mountain View, CA (US)

( * ) Notice: Subject to any disclaimer, the term of this patent is extended or adjusted under 35 U.S.C. 154(b) by 27 days.

(21) Appl. No.: 15/162,326

(22) Filed: May 23, 2016

(65) Prior Publication Data

US 2017/0337657 A1 Nov. 23, 2017

(51) Int. Cl.
| | | |
|---|---|---|
| G06T 7/40 | (2017.01) | |
| G06T 1/20 | (2006.01) | |
| G06T 5/10 | (2006.01) | |
| G06T 11/00 | (2006.01) | |
| H04N 1/60 | (2006.01) | |
| H04N 1/40 | (2006.01) | |
| G06K 9/40 | (2006.01) | |

(52) U.S. Cl.
CPC ............... *G06T 1/20* (2013.01); *G06T 7/408* (2013.01); *G06T 2207/20024* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0223622 A1* | 12/2003 | Simon | ............... | G06K 9/00281 382/118 |
| 2004/0070676 A1* | 4/2004 | Lawther | ............. | H04N 1/00249 348/222.1 |
| 2004/0071465 A1* | 4/2004 | Smart | .................... | G03B 17/00 396/435 |
| 2008/0317376 A1 | 12/2008 | Kasperkiewicz | | |
| 2009/0058873 A1* | 3/2009 | Brown Elliott | ......... | G06T 5/009 345/589 |
| 2016/0110168 A1 | 4/2016 | Feder et al. | | |
| 2017/0064204 A1 | 3/2017 | Sapiro et al. | | |

OTHER PUBLICATIONS

Adnan, Asit M. et al., "Efficient Kernel Fusion Techniques for Massive Video Data Analysis on GPGPUs," Sep. 15, 2015, retrieved Feb. 20, 2017 from http://epo.summon.serialssolutions.com/2.0.0/link/0/eLvHCXMwjV1NawlxEB1cvPTSalvoh8lcire-Orm62ehR1V1BBZJX2tCS7ExCKLW5b-vM7ybrgOWsYQiYk816GzBuAJ4bAzFcZiXCg7APFaKFC-UklHfWJCHpqeb-ud38dBEr- u42BRg6p7mzr87X5LeWBdvDBZ-GT672kOPvJ7tKFR3BiclEDXg8kjdcFTudRNqtL-Gq6otAh5vyQOspk6WgaM5z.

(Continued)

*Primary Examiner* — Wesner Sajous
(74) *Attorney, Agent, or Firm* — Patent Law Works LLP

(57) ABSTRACT

Techniques for merging multiple filters into a single GPU program is described. The system includes a filtering engine, which receives an input to apply a plurality of filters to a source image. The filtering engine identifies a first type of filter and a second type of filter from the input. The filtering engine identifies a supplemental transformation filter from the input, implements the supplemental transformation filter using a custom function to generate a color value at the source image and merges the first type of filter and the second type of filter based on the supplemental transformation filter. Finally, the filtering engine may apply the merged filter on the source image to generate a destination image.

21 Claims, 6 Drawing Sheets

(56) References Cited

OTHER PUBLICATIONS

International Search Report and Written Opinion for PCT/US2016/064999, dated Mar. 2, 2017, 15 pgs.

Liu, Bin et al., "An Efficient SAR Processor Based on GPU via CUDA," 2nd International Congress on Image and Signal Processing, 2009 (CISP), IEEE, Oct. 17, 2009, pp. 1-5.

Sung, Hsiang-Wei et al., "OpenCV Optimization on Heterogeneous Multi-Core Systems for Gesture Recognition Applications," 2016 45th International Conference on Parallel Processing Workshops (ICPPW), IEEE, Aug. 16, 2016, pp. 59-65.

* cited by examiner

MERGING FILTERS FOR A GRAPHIC PROCESSING UNIT

BACKGROUND

Users often apply a series of filters to an image or video to enhance the look of the image or video. These filters can include effects like vignettes, fisheye or other distortions, sepia or other color changes, blurs, adding overlays, etc. These filters can be implemented independently one after the other in various orders by taking an image as an input and generating an output image using the filter. Each filter can be implemented as its own graphics processing unit (GPU) operation. Combining multiple filters can have interesting and desirable results, such as applying a sharpening filter followed by a color enhancement, followed by a vignette. In addition, on some systems, each filter implemented as a GPU operation is often referred to as a GPU kernel. The GPU operations or kernels are implemented as a fragment shader that runs on every pixel of the destination image. The geometry rendered by the fragment shader is a single quad (two triangles) the size of the entire source image.

The GPU kernels generally identify the matching pixel from the source image via the texture mapping, mutate it, and determine the destination color. They can apply coordinate transformations by modifying the coordinates that are read from the texture. They can apply color transformations by modifying the color after reading it. They can also do more complex things like read multiple source pixels to apply a blur.

Furthermore, in order to combine these GPU kernels into one merged filter or a pipeline of filters, multiple passes are used to ping pong between two textures of the source image. In the ping pong technique, each filter is compiled into a single program that can execute on the GPU. An intermediate image is created that is only used for processing the multiple filters. A first filter is applied to the input image (source image) and output to the intermediate image. The second filter is then applied to the intermediate image and output to the output image. This process is repeated until all filters are completed. There are two major drawbacks for this technique. The first drawback is that it requires extra memory to store the intermediate texture of the source image, and the second drawback is that there is a lot of overhead in performing multiple passes and the performance can suffer.

The final output image is usually produced by putting together or composting the intermediate images generated by rendering more than one "layer" or "pass." To produce an image with a black and white blur with a fisheye distortion, while the effect chain described produces the correct result using multiple passes, it requires an extra full-size buffer and 3 full size render passes. This uses unnecessary GPU memory, strains the fill and texture rates of the GPU, and requires clearing the GPU pipeline between each pass to switch an output to an input. This is a particular problem for mobile devices that have limited computational power. The intended effect could be written as a single GPU kernel using a single pass, but it would be very special purpose. Implementing every potential combination of algorithms into its own GPU kernel is not practical because of the large quantity of potential combinations and the maintenance burden.

SUMMARY

Example embodiments provide a method for merging multiple filters into a single GPU program. According to one innovative aspect of the subject matter described in this disclosure, a method for merging multiple filters is disclosed. The method includes receiving an input to apply a plurality of filters to a source image; identifying a first type of filter from the input; identifying a second type of filter from the input; identifying a supplemental transformation filter from the input; implementing the supplemental transformation filter using a custom function to generate a color value at the source image; merging the first type of filter and the second type of filter based on the supplemental transformation filter to generate a merged filter; and applying the merged filter on the source image to generate a destination image.

According to another aspect of the subject matter described, the first type of filter is a color transformation filter that maps a first color of a first pixel from the source image to a second color in the destination image.

According to another innovative aspect of the subject matter described in this disclosure, the method for merging multiple filters includes determining, using the one or more computing devices, that the supplemental transformation filter is not identified in the received input; inserting, using the one or more computing devices, a substitute supplemental transformation filter into the received input; and merging, using the one or more computing devices, the first type of filter and the second type of filter based on the substitute supplemental transformation filter.

According to yet another innovative aspect of the subject matter described in this disclosure, the first type of filter is applied on the source image in forward order based on the supplemental transformation filter and the second type of filter is applied on the source image in reverse order based on the supplemental transformation filter. According to yet another innovative aspect of the subject matter described in this disclosure, the supplemental transformation filter is based on a fragment shader and runs in a single pass.

Other implementations of one or more of these aspects include corresponding systems, apparatus, and computer programs, configured to perform the actions of the methods, encoded on computer storage devices.

The specification advantageously describes a method for merging multiple filters into a single GPU program. Moreover, the operations performed at different ranges can apply the filters all at once. Overall the goal is to automatically merge multiple GPU kernels into a single rendering pass. Secondly, the specification describes an efficient way to merge multiple methods into a single GPU kernel using a single pass from the input directly to the output, which requires no pipeline flushes, less GPU memory, and fewer texture reads and pixel writes.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
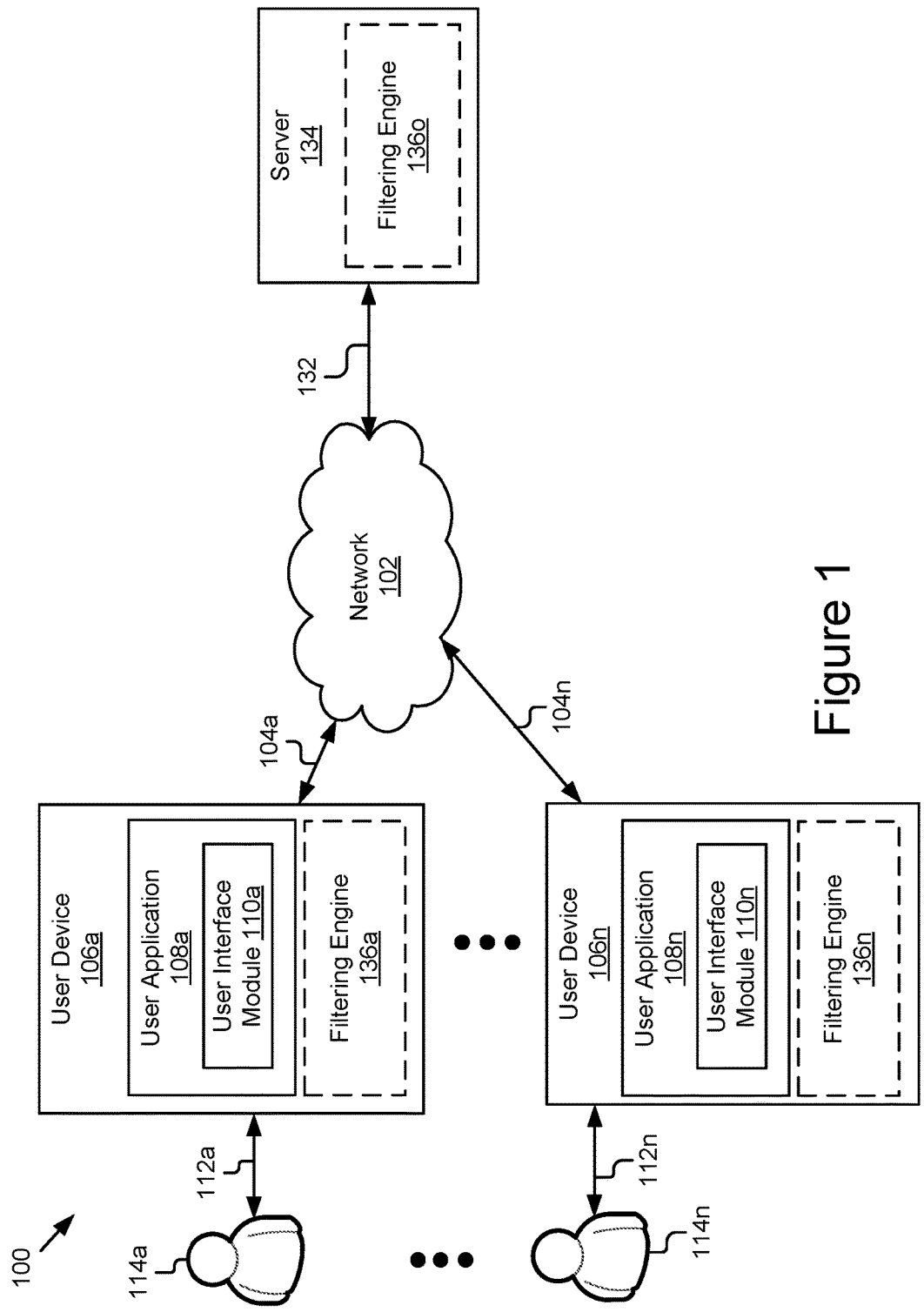
FIG. 1 is a block diagram illustrates a block diagram of an example system for merging multiple filters into a single GPU program that can apply all filters at once.

This specification relates to applying a series of filters to an image or video. More specifically, the specification relates to merging a series of filters into a graphics processor unit (GPU) operation so the filters can be applied to an input image to generate an output image.

In certain embodiments, a computer system and a computer-executed method are provided to implement one or more effects on still images as well as on moving images (e.g., videos), which are often a combination of programs running on multiple cores. The example system or method solves above-identified technical problems of requiring an intermediate image and requiring multiple passes between textures, and receives user input to apply a plurality of filters to a source image, merges the filters to produce a merged filter, and applies the merged filter on the source image to generate a destination image. This is advantageously performed in a single pass in some implementations. A supplemental transformation filter is also identified within the user input and the merged filter is determined by combining a plurality of filters from the user input based on the supplemental transformation filter. A supplemental transformation filter is a filter that applies one or more transformations (e.g., supplemental transformations such and color, blurring, sharpening, embossing, edge detection, etc.) to an image or part of an image. For example, the supplemental transformation filter may be based on a fragment shader and may run in a single pass. The example system or method describes an efficient way to combine multiple filters into a single GPU kernel using a single pass from the input directly to the output, which requires no pipeline flushes, less GPU memory, and fewer texture reads and pixel writes.

The basic merging method can take any number of color transformations (e.g. transformation operations that adjust the color values of an image or change color spaces) and coordinate transformations (e.g. transformation operations that convert from one coordinate space to another such as for scaling, shearing, rotation, reflection between frames) before/after a single supplemental transformation filter and combine them into a single merged filter. For example, the merging method may identify an input adjusting the color of an image and an input to map a coordinate associated with a pixel in the input image from a first location to a second location. In some embodiments, the supplemental transformation filter may also be a complex transformation filter that specifies the types of color transformations and the coordinate transformation to perform. If no supplemental transformation filter is identified in the plurality of filters included in the user input, a substitute supplemental transformation filter (sometimes also called a dummy transformation filter) can be created and inserted to merge the filters into a single merged filter. The substitute supplemental transformation filter is just like a supplemental transformation filter but is created by the system when no supplemental transformation filter is input. For example, turning an image black and white and then adding an overlay can be performed as computing the black and white value of the source pixel and then adding the overlay over that pixel as subsequent statements in the same merged filter.

In certain embodiments, a computer system and a computer-executed method creates a supplemental pipeline of steps. This is done by receiving user input to apply a plurality of coordinate transforms, a plurality of color transforms and a supplemental transform filter on a source image, applying the plurality of coordinate transform in reverse order, determining a value for a partially transformed coordinate based on the plurality of coordinate transforms, and applying the supplemental transform using a custom function to read the color value from the source image at the partially transformed coordinate. Finally, the computer system and a computer-executed method may apply the plurality of color transforms in forward order using the supplemental transform and the partially transformed coordinate. This is advantageous since only one pass is needed to apply the plurality of filters, and as a result there is no additional processing overhead of performing multiple passes. This filter merging method can be applied in a video chat program where users want to be able to enhance their visual appearance or modify the appearance of others. It can also be applied to a video editing program that allowed users to apply filters to their recorded video. It could further apply to image editing software where users may add a series of filters or enhancements to their images.

FIG. 1 illustrates a block diagram of an example system 100 for merging multiple filters into a single GPU program or filter that can apply all filters at once. The system 100 as illustrated has user (or client) devices 106a through 106n typically utilized by users 114a through 114n to access servers hosting websites via a network 102. The system 100 may include a server 134. In the illustrated example, these entities are communicatively coupled via the network 102.

It should be recognized that in FIG. 1 as well as other figures used to illustrate the invention, an indication of a letter after a reference number or numeral, for example, "106a" is a specific reference to the element or component that is designated by that particular reference numeral. In the event a reference numeral appears in the text without a letter following it, for example, "106," it should be recognized that such is a general reference to different embodiments of the element or component bearing that general reference numeral. Moreover, though only two user devices are illustrated in FIG. 1, it should be understood that any number of client devices 106n may be used by any number of users 114n.

The network 102 may be a conventional type, wired or wireless, and may have numerous different configurations including a star configuration, token ring configuration or other configurations. Furthermore, the network 102 may include a local area network (LAN), a wide area network (WAN) (e.g., the Internet), and/or other interconnected data paths across which multiple devices may communicate. In some embodiments, the network 102 may be a peer-to-peer network. The network 102 may also be coupled to or includes portions of a telecommunications network for sending data in a variety of different communication protocols. In some other embodiments, the network 102 includes Bluetooth communication networks or a cellular communications network for sending and receiving data including via short messaging service (SMS), multimedia messaging service (MMS), hypertext transfer protocol (HTTP), direct data connection, WAP, email, etc. In addition, although FIG. 1 illustrates a single network 102 coupled to the user devices 106 that are illustrated and the server 134, in practice one or more networks 102 may be connected to these entities.

The user devices 106a through 106n in FIG. 1 are used by way of example. Although only two user devices 106 are illustrated, the disclosure applies to a system architecture having any number of user devices 106 available to any number of users 114. In the illustrated embodiment, the users 114a through 114n interact with the user device 106a and 106n, via signal lines 112a through 112n, respectively. The user devices 106a through 106n are communicatively coupled to the network 102 via signal lines 104a through 104n respectively.

In some embodiments, the user device 106 (any or all of 106a through 106n) can be any computing device that includes a memory and a processor. For example, the user device 106 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 102, etc.

In some embodiments, the user devices 106a through 106n comprise a user application 108 (illustrated as 108a through 108n) and a filtering engine 136. The user 114 (114a through 114n) uses the user application 108 to exchange information with the filtering engine 136, and the server 134, as appropriate to accomplish the operations of the present invention. As one example, the user 114 may apply a plurality of filters to an image using user interface module 110a included in the user application 108a, and may receive results based on those filters from the filtering engine 136, via the user application 108. Further acts and/or functionalities of the user application 108 are described in further detail below with respect to at least FIG. 2.

The server 134 may be a computing device that includes a processor, a memory and network communication capabilities. The server 134 is coupled to the network 102, via a signal line 132. The server 134 may be configured to obtain a plurality of filters as an input, for enhancement of an image from the user devices 106 (106a through 106n), via the network 102. Although only one server 134 is shown, persons of ordinary skill in the art will recognize that multiple servers may be used, either in a distributed architecture or otherwise. For the purpose of this application, the system configuration and operations performed by the system are described in the context of a single server 134.

In some embodiments, the server 134 comprises a filtering engine 136 for applying a plurality of filters to an image or video. The filtering engine 136 may receive user input on a user interface module 110 from the user application 108, and then modifies an image based on the received user input on the user application 108. For example, the user 114 using a color transformation filter and a coordinate transformation filter may provide input to change the color of an image and subsequently apply a fisheye transformation to that image, and the filtering engine 136 may analyze the image and brighten it based on the desired user input received on the user application 108. By way of another example, the user 114 using a color transformation filter and a supplemental filter may provide input to change color of an image and subsequently apply blur to the image, and the filtering engine 136 may analyze the image, change the color of the image and apply blur, based on the desired user input received on the user device 106. Other numerous examples are also possible and contemplated.

As depicted in FIG. 1, the filtering engine 136 is shown in dotted lines to indicate that the operations performed by the filtering engine 136 as described herein can be performed either server-side (e.g., server 134) or user-side (e.g., user devices 106a though 106n), or a combination of the two. Additional structure, acts, and/or functionality of the filtering engine 136 is described in further detail below with respect to at least FIG. 2.

Figure 2:
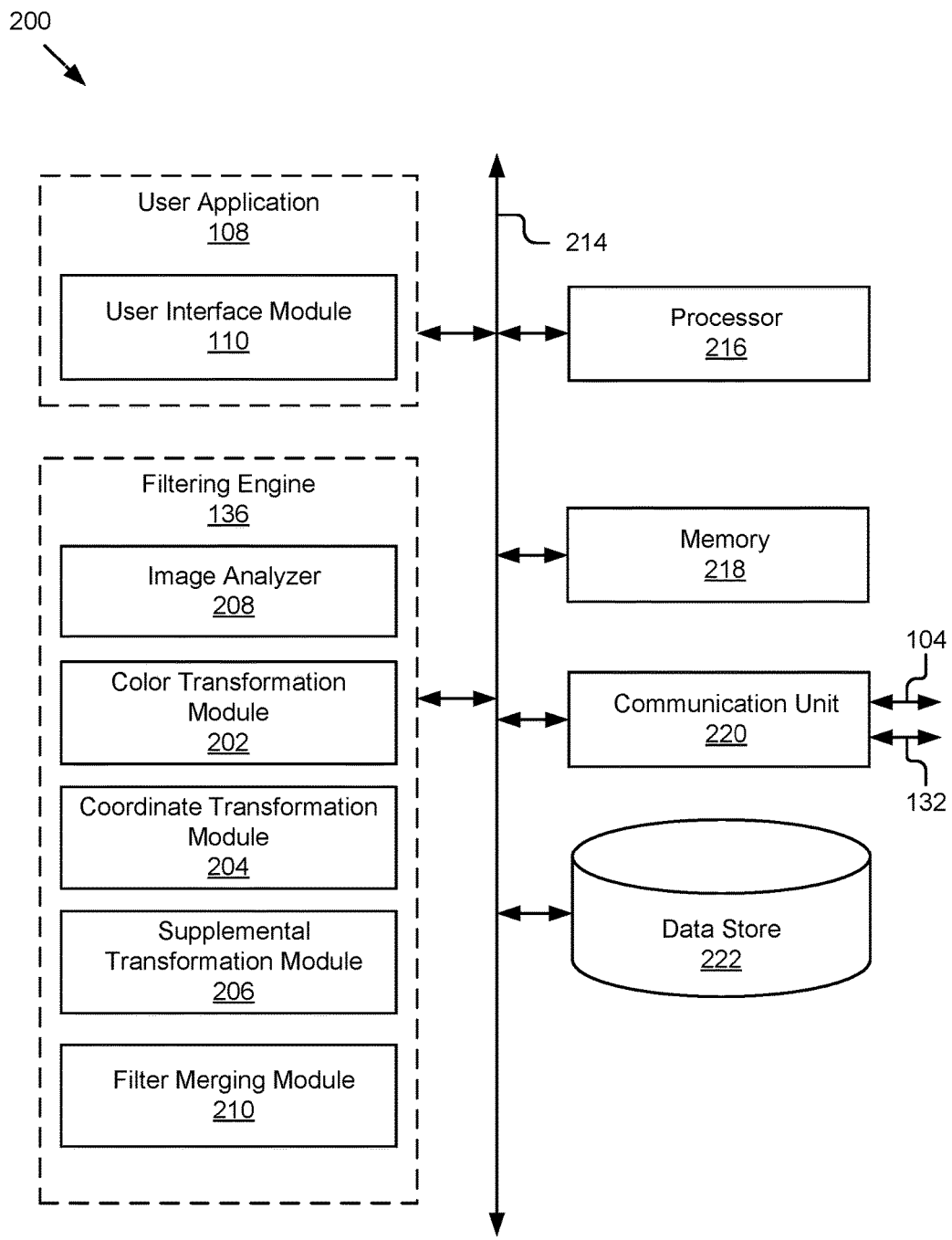
FIG. 2 is a block diagram illustrating an example computing device including the filtering engine.

FIG. 2 is a block diagram of an example computing device 200, which may be representative of a computing device included in the server 134 and/or the user device 106. As depicted, the computing device 200 may include a processor 216, a memory 218, a communication unit 220, a data store 222, and one or more of a user application 108, and a an filtering engine 136, which may be communicatively coupled by a communication bus 214.

Depending upon the configuration, the computing device 200 may include differing components. For instance, in a server-side embodiment, the computing device 200 may include the filtering engine 136. In an example client-side embodiment, the computing device 200 may include the user application 108, and/or the filtering engine 136. It should be understood that the above configurations are provided by way of example and numerous further configurations are contemplated and possible.

The processor 216 may execute software instructions by performing various input, logical, and/or mathematical operations. The processor 216 may have various computing architectures to method data signals including, for example, a complex instruction set computer (CISC) architecture, a reduced instruction set computer (RISC) architecture, and/or an architecture implementing a combination of instruction sets. The processor 216 may be physical and/or virtual, and may include a single core or plurality of processing units and/or cores. In some embodiments, the processor 216 may be capable of generating and providing electronic display signals to a display device, supporting the display of images, capturing and transmitting images, performing complex tasks including various types of feature extraction and sampling, etc. In some embodiments, the processor 216 may be coupled to the memory 218 via the bus 214 to access data and instructions therefrom and store data therein. The bus 214 may couple the processor 216 to the other components of the computing device 200 including, for example, the memory 218, communication unit 220, and the data store 222.

The memory 218 may store and provide access to data to the other components of the computing device 200. In some embodiments, the memory 218 may store instructions and/or data that may be executed by the processor 216. The memory 218 is also capable of storing other instructions and data, including, for example, an operating system, hardware drivers, other software applications, databases, etc. The memory 218 may be coupled to the bus 214 for communication with the processor 216 and the other components of the computing device 200.

The memory 218 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 216. In some embodiments, the memory 218 may include one or more of volatile memory and non-volatile memory (e.g., RAM, ROM, hard disk, optical disk, etc.). It should be understood that the memory 218 may be a single device or may include multiple types of devices and configurations.

The bus 214 can include a communication bus for transferring data between components of a computing device or between computing devices, a network bus system including the network 102 or portions thereof, a processor mesh, a combination thereof, etc. In some embodiments, the user application 108 and the filtering engine 136 may cooperate and communicate via a software communication mechanism implemented in association with the bus 214. The software communication mechanism can include and/or facilitate, for example, inter-process communication, local function or procedure calls, remote procedure calls, network-based communication, secure communication, etc.

The communication unit 220 may include one or more interface devices for wired and wireless connectivity with the network 102 and the other entities and/or components of the system 100 including, for example, the user devices 106, the server 134, and the data store 222, etc. For instance, the communication unit 220 may include, but is not limited to, CAT-type interfaces; wireless transceivers for sending and receiving signals using Wi-Fi™; Bluetooth®, cellular communications, etc.; USB interfaces; various combinations thereof; etc. The communication unit 220 may be coupled to the network 102 via the signal lines 104 and 132. In some embodiments, the communication unit 220 can link the processor 216 to the network 102, which may in turn be coupled to other processing systems. The communication unit 220 can provide other connections to the network 102 and to other entities of the system 100 using various standard communication protocols, including, for example, those discussed elsewhere herein.

The data store 222 is an information source for storing and providing access to data. In some embodiments, the data store 222 may be coupled to the components 216, 218, 220, 108, and/or 136 of the computing device 200 via the bus 214 to receive and provide access to data. In some embodiments, the data store 222 may store data received from the other entities 106 and/or 134 of the system 100, and provide data access to these entities. The data store 222 can include one or more non-transitory computer-readable mediums for storing the data. In some embodiments, the data store 222 may be incorporated with the memory 218 or may be distinct therefrom. In some embodiments, the data store 222 may include a database management system (DBMS). For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

As depicted, the user application 108 includes user interface module 110. The user interface module 110 may be software including routines for receiving user inputs and then sending those inputs to one or more other components of the filtering engine 136 to perform their respective acts and/or functionalities thereon. In some embodiments, a user input may include, for example, an input adjusting the color of an image using a color transformation module 202, an input for applying coordinate transformation on an image using a coordinate transformation module 204, and an input for applying supplemental transformation filter on an image using a supplemental transformation module 206. In some embodiments, the user interface module 110 may also be configured to receive output image from other components of the filtering engine 136 and then provide the output image for display to the user.

The user interface module 110 may receive instructions from a user to apply a plurality of filters on an image or video. The user interface module 110 may receive an input image from a user and may receive instructions to apply a plurality of filters in succession on the input image, for example, the user may instruct the filtering engine 136 via the user application 110 to add a plurality of color transformation filters and a plurality of supplemental transformation filters to the input image.

In some embodiments, the user interface module 110 may perform its operation discussed herein in cooperation with one or more components of the filtering engine 136. For instance, the user interface module 110 may apply a plurality of filters on an input image in cooperation with the color transformation module 202, the coordinate transformation module 204, the supplemental transformation module 206, the image analyzer 208, and the filter merging module 210 of the filtering engine 136.

As depicted, the image enhancement engine 136 includes a color transformation module 202, a coordinate transformation module 204, a supplemental transformation module 206, an image analyzer 208, and a filter merging module 210. The components 202, 204, 206, 208, and 210 of the filtering engine 136 are coupled for communication with each other and the other components 108, 110, 216, 218, 220, and 222 of the computing device 200. The components 202, 204, 206, 208, and 210 are also coupled to the network 102 via the communication unit 220 for communication with the other entities of the system 100.

In some embodiments, the color transformation module 202, the coordinate transformation module 204, the supplemental transformation module 206, the image analyzer 208, and the filter merging module 210, are sets of instructions executable by the processor 216 to provide their respective acts and/or functionality. In other embodiments, the color transformation module 202, the coordinate transformation module 204, the supplemental transformation module 206, the image analyzer 208, and the filter merging module 210 are stored in the memory 218 of the computing device 200 and are accessible and executable by the processor 216 to provide their respective acts and/or functionality. In any of these embodiments, the color transformation module 202, the coordinate transformation module 204, the supplemental transformation module 206, the image analyzer 208, and the filter merging module 210 may be adapted for cooperation and communication with the processor 216 and other components 108, 110, 218, and 220 of the computing device 200.

The image analyzer 208 may be software including routines for analyzing an input image that has been received by the user interface module 110 for application of filters. In some embodiments, analyzing the image may include determining current lightening details associated with the image, current color details (e.g., what colors in the image are already saturated vs non-saturated, whether the image is over-saturated, intensity of saturation in the image, etc.) associated with the image, determining one or more protecting regions (e.g., skin tones in the image, one or more people present in the image, etc.) associated with the image, determining the location of each pixel associated with the source image, etc. In some embodiments, the image analyzer may send the results of its analysis to the color transformation module 202, the coordinate transformation module 204, the supplemental transformation module 206, and the filter merging module 210, which may then use those results to base their operations thereon.

The color transformation module 202 may be software including routines for adjusting the color of an image. In some embodiments, adjusting the color of the image may include transforming the color of the image as discussed elsewhere herein. In some embodiments, the color transformation module 202 may transform the color of the image based on the image analyzer determining the color details of the image. The color transformation module 202 may map colors from the input image to different colors on the output image through a transformation. In some embodiments, the transformation is a mathematical transformation, for example, a black and white transformation. In some embodiments, the transformation is an overlay transformation that reads colors from an overlay texture. The color transformation module 202 may perform its operation described herein in cooperation with the user inputs received on the user interface module 110.

In some embodiments, the color transformation module 202 may receive the color from the input image and the pixel location on the output image where they need to compute a color, as input. For example, the color transformation module 202 may receive information associated with location and color of a pixel in an input image and computes the color at the pixel location on the output image. The color transformation module 202 may output the color that will be used at the pixel location on the output image based on the color at the pixel location on the input image. The color transformation module 202 may also saturate or de-saturate the source image based on a user's application of the color transformation filter. The color transformation module 202 may receive the total number of color transformation filter inputs from the user interface module 110.

If the total number of color transformation filter inputs is higher than a predetermined threshold, the color transformation module 202 may determine that the user intends to saturate the image and may then saturate the image by 1) saturating the colors in the image that are not already saturated and 2) protecting the skin tone of people in the images while saturation. If on the other hand, the color transformation filter input from the user indicates that the user intends to de-saturate the source image, the color transformation module 202 may then de-saturate the image by de-saturating the colors in the image that are not already de-saturated based on the amount of de-saturation reflected by the user's color transformation filter input. In some embodiments, once the color transformation module 202 is done performing its color transformation as described herein, the color transformation module 202 may send its color adjustments to the coordinate transformation module 204 and the supplemental transformation module 206, which may then use those adjustments and other further adjustments to finalize the image for display to the user. Additional description regarding the color transformation filter is further discussed below with respect to at least FIGS. 3A-3C and 4.

The coordinate transformation module 204 may be software including routines for adjusting coordinates of an image. In some embodiments, adjusting the coordinates of the image may include transforming the coordinates of the image as discussed elsewhere herein. In some embodiments, the coordinate transformation module 204 may transform the coordinates of the source image based on the image analyzer determining the coordinate details of the image. The coordinate transformation module 204 may map pixel locations on the output image to different pixel locations on the source image, through a transformation. In some embodiments, the transformation is a mathematical transformation, for example, a fisheye transformation. In some embodiments, the transformation uses other inputs as in a perspective transformation that uses a depth map texture. The coordinate transformation module 204 may perform its operation described herein in cooperation with the user inputs received on the user interface module 110.

In some embodiments, the coordinate transformation module 204 may receive the location of the pixels on the output image that will be affected after the coordinate transform, as input, and outputs a coordinate associated with each pixel on the input image that should be used to provide that output. For example, the coordinate transformation module 204 may receive information associated with location of a pixel in an input image and computes the location of that pixel after the coordinate transformation, on the output image. The coordinate transformation module 204 may output the coordinate of the source pixel to use during the transformation, for each destination pixel. The coordinate transformation module 204 may also apply a plurality of coordinate transformations on the source image based on a user's application of the coordinate transformation filter. The coordinate transformation module 204 may receive the total number of coordinate transformation filter inputs from the user interface module 110.

In some embodiments, once the coordinate transformation module 204 is done performing its coordinate transformation as described herein, the coordinate transformation module 204 may send its coordinate transforms to the color transformation module 202 and the supplemental transformation module 206, which may then use those adjustments and other further adjustments to finalize the image for display to the user. Additional description is further discussed below with respect to at least FIGS. 3A-3C and 4.

The supplemental transformation module 206 may be software including routines for adjusting other parameters of an image. In some embodiments, adjusting the other parameters of the input image may include transforming other parameters of the image as discussed elsewhere herein. In some embodiments, the supplemental transformation module 206 may receive the location of a pixel on the output image generated during the application of the supplemental transformation filter, and may look up color values at the location of the pixel on the input image using a function. The supplemental transformation module 206 may read the source colors from an input image and output the color to use for each pixel on the output image. In some embodiments, the supplemental transformation is a blur, which needs to read the color from multiple source pixels and blend them according to some predetermined weights. The supplemental transformation module 206 may perform its operation described herein in cooperation with the user inputs received on the user interface module 110.

In some embodiments, the supplemental transformation module 206 may receive a color for a pixel at a particular location on the input image, as input, and outputs a color to use for the pixel on the output image, after application of the supplemental transformation filter. For example, the supplemental transformation module 206 may receive information associated with color of a pixel in an input image and outputs the color of that pixel after a plurality of supplemental transformations, on the input image. The supplemental transformation module 206 may output the color of each pixel in the input image, which was used during the supplemental transformation. The supplemental transformation module 206 may receive the total number of supplemental transformation filter inputs from the user interface module 110. In some embodiments, once the supplemental transformation module 206 is done performing its supplemental transformations as described herein, the supplemental transformation module 206 may send its coordinate transforms to the color transformation module 202 and the coordinate transformation module 204, which may then use those adjustments and other further adjustments to finalize the image for display to the user. Additional description is further discussed below with respect to at least FIGS. 3A-3C and 4.

The filter merging module 210 may be software including routines for merging a plurality of filters into a single filter. In some embodiments, the filter merging module 210 may receive input including a plurality of color transformation filters, a plurality of coordinate transformation filters and a plurality of supplemental transformation filters and generate a single transformation filter based on the input. In some embodiments, the merged filter generates an output image using the color transformation module 202, the coordinate transformation module 204, and the supplemental transformation module 206, and then finalizes the image if required.

In some embodiments, the filter merging module 210 computes the source color for a given filter based on the algorithm of a filter of a previous pass. For example, the filter merging module 206 turns an input image black and white and then adds an overlay by computing the black and white value of a source pixel of the input image and then adds the overlay over that pixel as subsequent statements in the same program.

In some embodiments, the filter merging module 210 may perform the method of merging multiple filters into a single GPU program. In some embodiments, the filter merging module 210 may take any number of color transformation filters and coordinate transformation filters before a single supplemental transformation filter and combine them into a single program. In other embodiments, the filter merging module 210 may take any number of color transformation filters and coordinate transformation filters after a single supplemental transformation filter and combine them into a single program.

In some embodiments, the filter merging module 210 may generate a merged filter that applies all coordinate transformation filters that come after the supplemental transformation filter, in a reverse order. All coordinate transformations are performed by the coordinate transformation module 204. The coordinate transforms are usually thought of as affecting the source coordinates, but in a GPU they actually need to do a reverse transform on destination coordinates, hence they need to be applied in reverse. The filter merging module 210 may then run the supplemental transformation filter using a custom function to get source colors. For example, the supplemental transformation filter takes a coordinate as input and produces a color to use for that coordinate, using a function to read source color values at pixels in the input image. In some embodiments, the custom function in the supplemental transformation filter for source colors, takes a coordinate and computes the color for that coordinate after all filters before the supplemental transformation filter is applied.

In some embodiments, the filter merging module 210 may then apply all color transformation filters that are requested after the supplemental transformation filter in forward order. For example, the color transformation module 202 may generate a color for each pixel in the output image based on the source color values at pixels in the input image generated by the supplemental transformation filter. The color transformation filters may require the partially transformed destination coordinates as it would be at that step in the pipeline, while generating the final output image. Through this method, the filters can all be merged into a single program that is then applied to the input image to generate the output image in a single step and with no intermediate images.

In some embodiments, the filter merging module 210 may determine whether there is a supplemental transformation filter defined in the set of filters received as input from a user. In response to determining that a supplemental transformation filter is not present in the received set of filters, a substitute supplemental transformation filter may be inserted to merge all of the filters into a single filter.

In some embodiments, the filter merging module 210 may generate a merged filter including some other filters or image enhancement techniques to further enhance the image. Once the image is finalized, the filter merging module 210 may send the finalized image to the user interface module 110, which is communicatively coupled to the filtering engine 136 and which may then provide the output image for user display.

Additional structure, acts, and/or functionality of the color transformation module 202, the coordinate transformation module 204, the supplemental transformation module 206, the image analyzer 208, and the filter merging module 210 are further described below with respect to at least FIGS. 3A-3C and FIG. 4.

Methods

Figure 3A:
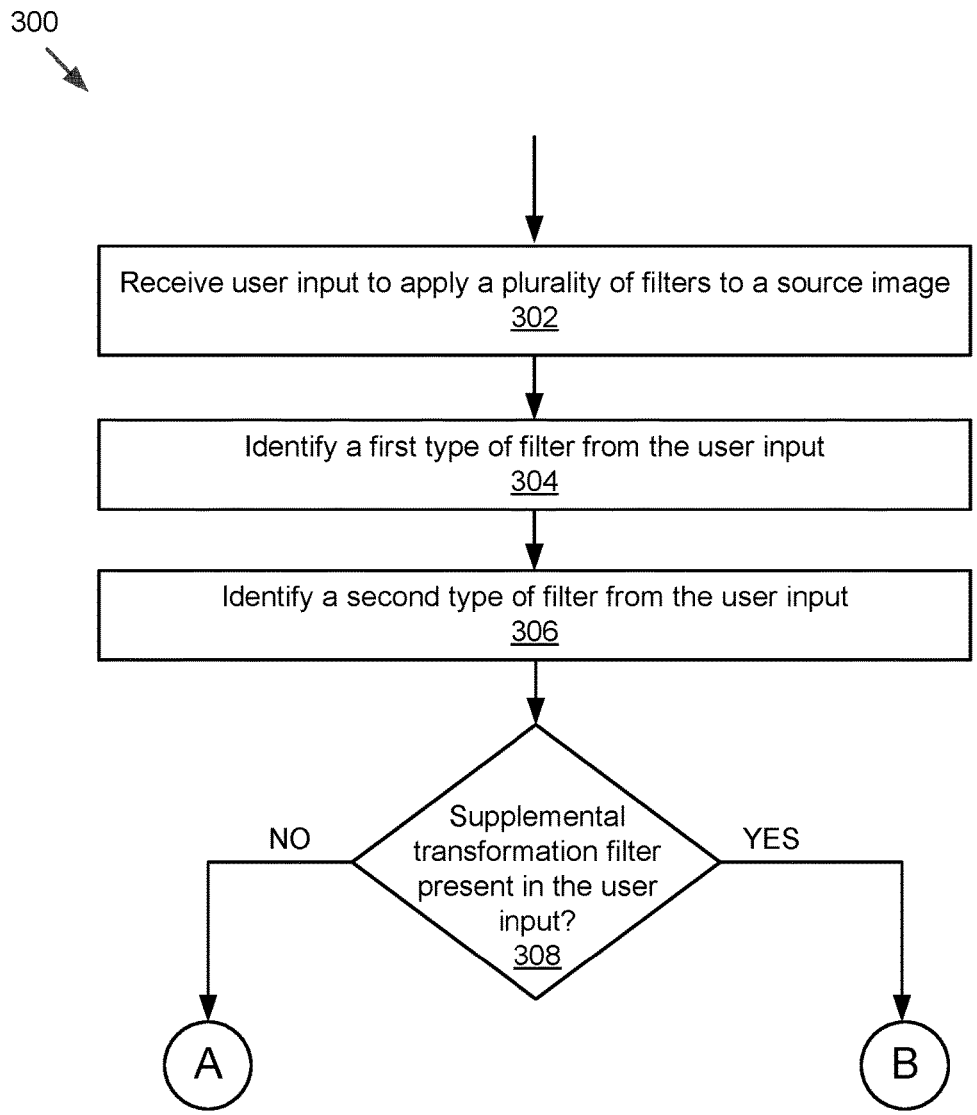
FIGS. 3A-3C are flowcharts illustrating an example method for merging multiple filters into a single GPU program.
Figure 3B:
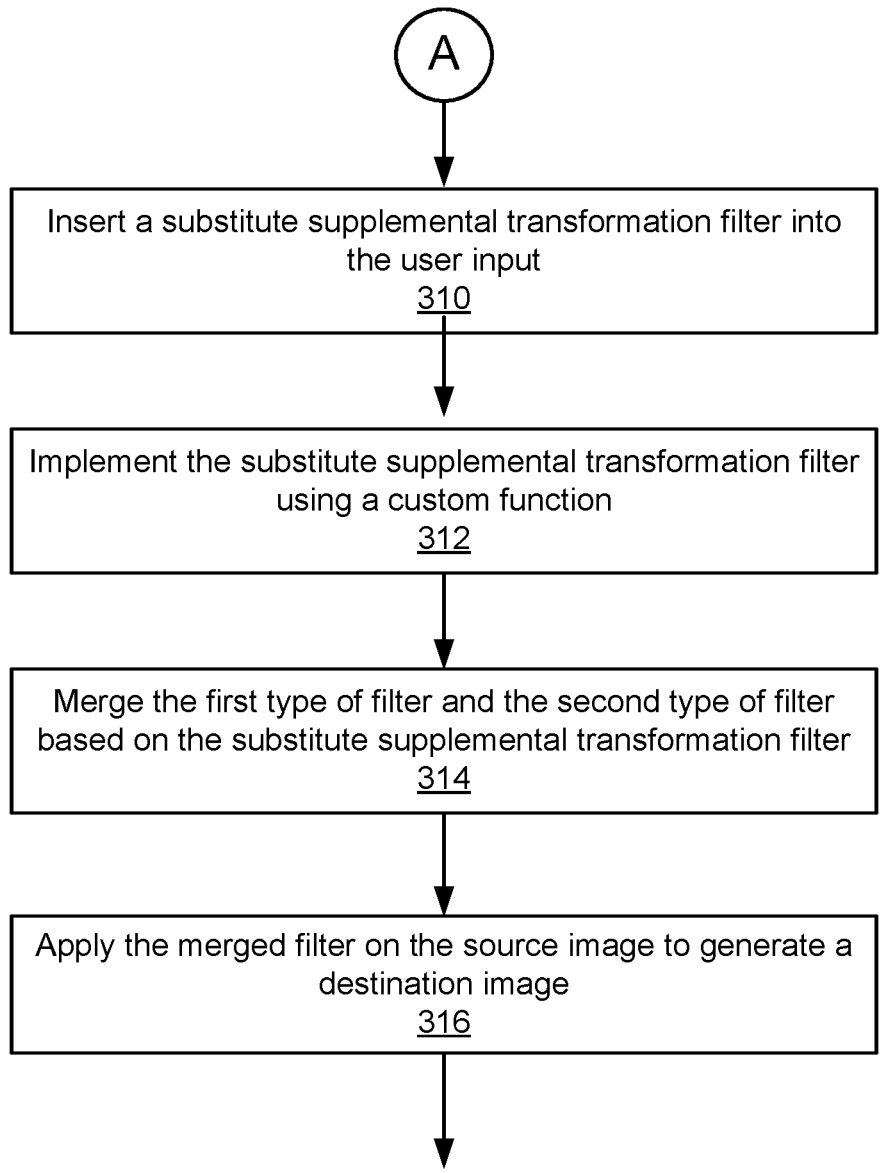
Figure 3C:
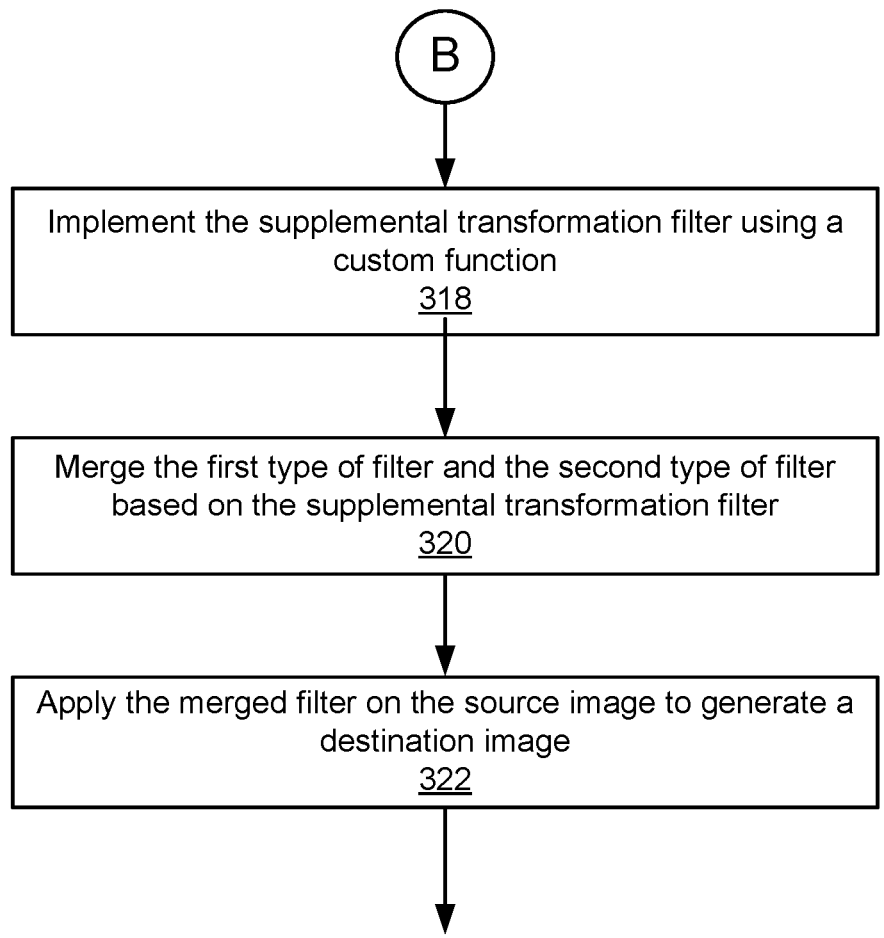

FIGS. 3A-3C are flowcharts illustrating an example method 300 for merging multiple filters into a single GPU program. The method 300 begins by receiving 302 a user input to apply a plurality of filters to a source image. In application 108, for example, the user application may be an image application installed on a user device 106 and the photo application, may receive the user selection for merging filters.

The method 300 continues by identifying 304 a first type of filter from the user input and identifying 306 a second type of filter from the user input. In some embodiments, the identifying 304 can be done by analyzing the category of transforms (color, location or complex), the inputs provided (color, location, etc.), the output requested (color, location, etc.) or the format of the input or output. Each filter is specified in a specific format depending on the category. For example, the color transformation filters are algorithms that map colors from the source image to different colors on the destination image. They receive the color from the source image and the location on the output image where they need to compute a color, as an input. Color transformation filters output the color that will be used at that output location. Coordinate transformation filters are algorithms that map pixel locations on the destination image to different pixel locations on the source image. They receive the location on the output image that is currently being affected as an input and output the coordinate on the input image that should be used to provide that output color. Complex algorithms have as input the location on the output image that is currently being affected and are provided with a function that looks up color values given a location on the input image. Complex algorithms output the color to use for the output location being affected. Thus, by analyzing the category of transforms (color, location or complex), the inputs provided (color, location, etc.), the output requested (color, location, etc.) or the format of the input or output, the first type of filter type and the second type of filter type can be determined. In one typical example, the method 300 may identify a color transformation input and a coordinate transformation input from the user input. In some embodiments, the method may also associate the first type of filter with the color transformation input and the second type of filter with the coordinate transformation input. The method 300 may then determine 308 that a supplemental transformation filter is not present in the user input. If the method 300 determines 308 that a supplemental transformation filter is not present in the user input, then the method 300 may proceed to blocks 310, 312, 314, and 316, (see FIG. 3B). For example, the method 300 may identify a plurality of filters from the user input and may determine that the supplemental transformation filter is not included as one of the plurality filters. In some implementations, if none of the plurality of filters has a complex type (e.g., requires a look up or application of a function), then there is no supplemental transformation filter present. On the other hand, if the method 300 determines 308 that a supplemental transformation filter is present in the user input, then the method 300 may proceed to blocks 318, 320, and 322 (see FIG. 3C). For instance, the method 300 may determine that the supplemental transformation filter is not identified in the user input and the method 300 may insert a substitute supplemental transformation filter into the user input.

In some embodiments, the first type of filter may be a color transformation filter and the second type of filter may be a coordinate transformation filter. In some embodiments, the user may input a plurality of color transformation filters and a plurality of coordinate transformation filters to a source image. For example, a user may use the user interface module 110 to specify the first and second type of filters.

If the method 300 determines that a supplemental transformation filter is not present in the user input, the method 300 may simply proceed to FIG. 3B to insert 310 a substitute supplemental transformation filter into the user input, implements 312 the substitute supplemental transformation filter using a custom function, and merge 314 the first type of filter and the second type of filter based on the substitute supplemental transformation filter, as discussed elsewhere herein. The method 300 next applies 316 the merged filter on the source image to generate a destination image. This is done in one step so that no intermediate images are needed and the memory requirement is reduced.

If on the other hand, the method 300 determines that a supplemental transformation filter is present in the user input, the method 300 proceeds to FIG. 3C to implement 318 the supplemental transformation filter using a custom function, and merge 320 the first type of filter and the second type of filter based on the supplemental transformation filter, as discussed elsewhere herein. For example, the custom function is a function to determine a source color of a pixel in the source image. In some embodiments, the custom function may be used to compute a color of a pixel in the source image after the application of the first type of filter and the second type of filter on the source image. In other embodiments, the custom function for source colors takes a coordinate and computes the color for that coordinate after transforms, but before the complex algorithm is applied. For example, the custom function may 1) apply any coordinate transforms in reverse order to the coordinate passed in; 2) read the color value from the source texture at the resulting coordinate; and 3) apply any color transforms in forward order, potentially using the partially transformed coordinate. The method 300 finally applies 322 the merged filter on the source image to generate a destination image.

Figure 4:
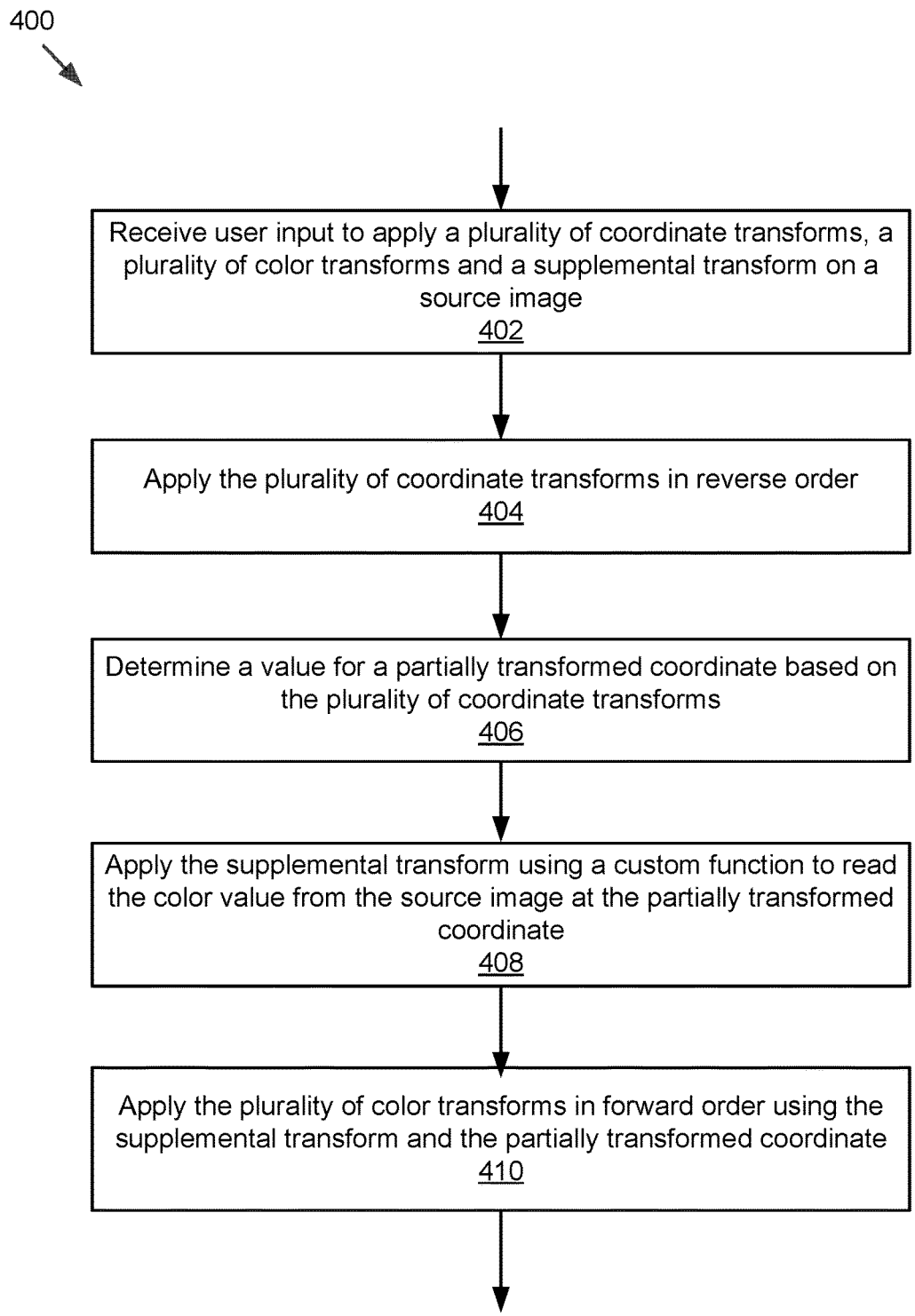
FIG. 4 is an example method for applying multiple filters on a source image.

FIG. 4 is an example method 400 for applying multiple filters on a source image. The method 400 begins by receiving 402 user input to apply a plurality of coordinate transforms, a plurality of color transforms and a supplemental transform on a source image. The method 400 continues by applying 404 the plurality of coordinate transform in reverse order. In some embodiments, the filtering engine 136 may apply the plurality of coordinate transformation filters that come after the supplemental transformation filter in the user input, in a reverse order. In some embodiments, the filtering engine 136 may apply the plurality of coordinate transformation filters that come before the supplemental transformation filter in the user input, in a reverse order.

The method 400 then determines 406 a value for a partially transformed coordinate based on the plurality of coordinate transforms. The method 400 continues to apply 408 the supplemental transform using a custom function to read the color value from the source image at the partially transformed coordinate. Finally, the method 400 may apply 410 the plurality of color transforms in forward order using the supplemental transform and the partially transformed coordinate. This is advantageous since only one pass is needed to apply the plurality of filters, and as a result there is no additional processing overhead of performing multiple passes. In some embodiments, the operations in blocks 404-410 may be performed by the filtering engine 136.

In some embodiments, the intermediate image generated without merging a plurality of filters is not discretized at each step. This applies both to coordinates and colors. For example, if one filter from the user input adds a large border around the image and scales down the image inside the border by 50% and another filter applies a 2× magnification to center of the image. If the border is applied first to produce an image, every other pixel in the image will be lost due to the resolution of the intermediate image. If the magnification is applied after that, those pixels end up doubling in size, but the pixels do not regain the lost resolution. With merging, both transformations are computed in the same filter and the intermediate image is not stored. Therefore, in this example, the reverse of the magnification filter is applied first and then the reverse of the border filter is applied. The result is that each pixel in the center of the image is shrunk and then expanded again and the output pixels at the center of the image correspond 1:1 to input pixels at the center, with no loss of resolution.

In some embodiments, this can be applied to color as well. For example, the user input includes a first filter makes the source image much darker followed by a second filter that makes a region of the image (the face for example) lighter. If the filters are applied without merging, in such a way that the application of the merged filter will include an intermediate image, the colors are reduced in precision. This is because an 8 bit value may be stored for example in 6 bits of the intermediate image since two bits are used to darken the image. The area of the image that is then lightened does not gain the precision back as it only has 6 bits of information. If a merged filter is applied instead, the intermediate color values can be stored with higher precision (12 or 16 bits) and so there is still 8 bits of precision left after the darkening and lightening.

In situations in which the systems and methods discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Reference in the specification to "some embodiments" or "an embodiment" means that a particular feature, structure, or characteristic described in connection with the embodiment is included in at least some instances of the description. The appearances of the phrase "in some embodiments" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiments, an entirely software embodiment or embodiments containing both hardware and software elements. In some embodiments, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or social network data stores through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, using one or more computing devices, an input to apply a plurality of filters to a source image;
identifying, using the one or more computing devices, a first type of filter from the input;
identifying, using the one or more computing devices, a second type of filter from the input;

identifying, using the one or more computing devices, a supplemental transformation filter from the input, the supplemental transformation filter using a function to determine a color value in the source image;

merging, using the one or more computing devices, the first type of filter, the supplemental transformation filter, and the second type of filter to generate a merged filter, wherein the merged filter executes on the source image a reverse of the first type of filter to generate a first value, the supplemental transformation filter to process the first value using the function to generate a second value, and the second type of filter to process the first value and the second value to generate a third value for the destination image; and applying, using the one or more computing devices, the merged filter on the source image to generate the destination image.

2. The computer-implemented method of claim 1, wherein the second type of filter is a color transformation filter that maps a first color of a first pixel from the source image to a second color in the destination image.

3. The computer-implemented method of claim 1, wherein the first type of filter is a coordinate transformation filter that maps at least one pixel location in the destination image to one or more different pixel locations in the source image.

4. The computer-implemented method of claim 1 further comprising:

determining, using the one or more computing devices, that the supplemental transformation filter is not identified in the received input;

inserting, using the one or more computing devices, a substitute supplemental transformation filter into the received input; and merging, using the one or more computing devices, the first type of filter, the substitute supplemental transformation filter, and the second type of filter to generate the merged filter.

5. The computer-implemented method of claim 1, wherein the second type of filter is applied on the source image in forward order of application in the merged filter.

6. The computer-implemented method of claim 1, wherein the first type of filter is applied on the source image in reverse order of application in the merged filter.

7. The computer-implemented method of claim 1, wherein the supplemental transformation filter is based on a fragment shader and runs in a single pass.

8. A computer program product comprising a non-transitory computer readable medium storing a computer readable program, wherein the computer readable program when executed on a computer causes the computer to perform operations comprising:

receiving an input to apply a plurality of filters to a source image;

identifying a first type of filter from the input;

identifying a second type of filter from the input;

identifying a supplemental transformation filter from the input, the supplemental transformation filter using a function to determine a color value in the source image;

merging the first type of filter, the supplemental transformation filter, and the second type of filter to generate a merged filter, wherein the merged filter executes on the source image a reverse of the first type of filter to generate a first value, the supplemental transformation filter to process the first value using the function to generate a second value, and the second type of filter to process the first value and the second value to generate a third value for the destination image; and applying the merged filter on the source image to generate the destination image.

9. The computer program product of claim 8, wherein the second type of filter is a color transformation filter that maps a first color of a first pixel from the source image to a second color in the destination image.

10. The computer program product of claim 8, wherein the first type of filter is a coordinate transformation filter that maps at least one pixel location in a destination image to one or more different pixel locations in the source image.

11. The computer program product of claim 8, wherein the operations further comprise:

determining that the supplemental transformation filter is not identified in the received input;

inserting a substitute supplemental transformation filter into the received input; and merging the first type of filter, the substitute supplemental transformation filter, and the second type of filter to generate the merged filter.

12. The computer program product of claim 8, wherein the first type of filter is applied on the source image in forward order of application in the merged filter.

13. The computer program product of claim 8, wherein the second type of filter is applied on the source image in reverse order of application in the merged filter.

14. The computer program product of claim 8, wherein the supplemental transformation filter is based on a fragment shader and runs in a single pass.

15. A system comprising:

one or more processors;

a user interface module stored on a memory and executable by the one or more processors, the user interface module configured to receive an input to apply a plurality of filters to a source image; and a filtering engine stored on the memory and executable by the one or more processors, the filtering engine configured to:

identify a first type of filter from the input;

identify a second type of filter from the input;

identify a supplemental transformation filter from the input, the supplemental transformation filter using a function to determine a color value in the source image;

merge the first type of filter, the supplemental transformation filter, and the second type of filter to generate a merged filter, wherein the merged filter executes on the source image a reverse of the first type of filter to generate a first value, the supplemental transformation filter to process the first value using the function to generate a second value, and the second type of filter to process the first value and the second value to generate a third value for the destination image; and apply the merged filter on the source image to generate the destination image.

16. The system of claim 15, wherein the filtering engine comprises a color transformation module as the second type of filter for mapping a first color from the source image to a second color in the destination image.

17. The system of claim 15, wherein the filtering engine comprises a coordinate transformation module as the first type of filter for mapping a first pixel location from the source image to a second pixel location in the destination image.

18. The system of claim 15, wherein the filtering engine comprises a supplemental transformation module for determining whether the supplemental transformation filter is identified in the received input, responsive to determining that the supplemental transformation filter is not identified in the received input, inserting a substitute supplemental transformation filter into the received input, and merging the first type of filter, the substitute supplemental transformation filter, and the second type of filter to generate the merged filter.

19. The system of claim 15, wherein the second type of filter is applied on the source image in forward order of application in the merged filter.

20. The system of claim 15, wherein the first type of filter is applied on the source image in reverse order of application in the merged filter.

21. The system of claim 15, wherein the supplemental transformation filter is based on a fragment shader and runs in a single pass.

* * * * *